Figure 3:
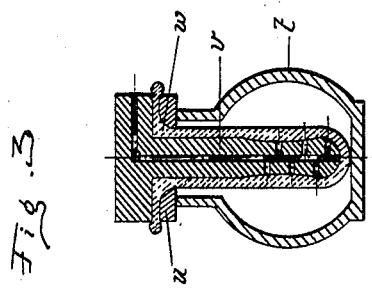

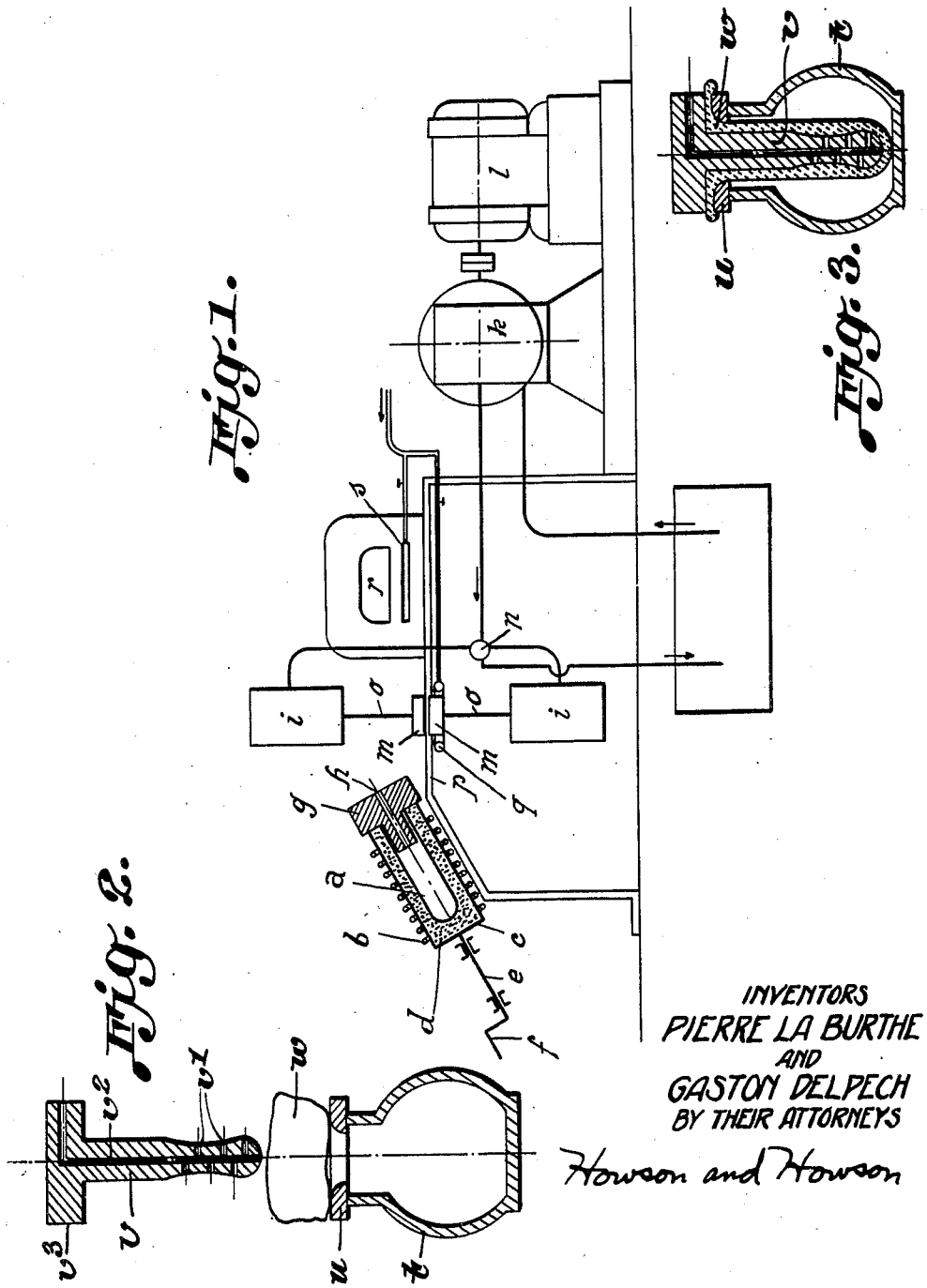

Sept. 30, 1930. P. LA BURTHE ET AL 1,777,206
PROCESS FOR HOT STAMPING ARTICLES OF FUSED SILICA
Filed Jan. 5, 1928 2 Sheets-Sheet 2

INVENTORS
PIERRE LA BURTHE
AND
GASTON DELPECH
BY THEIR ATTORNEYS
Howson and Howson Patented Sept. 30, 1930

1,777,206

UNITED STATES PATENT OFFICE

PIERRE LA BURTHE AND GASTON DELPECH, OF NEMOURS, FRANCE, ASSIGNORS TO SOCIÉTÉ QUARTZ & SILICE, OF PARIS, FRANCE, A CORPORATION OF FRANCE

PROCESS FOR HOT-STAMPING ARTICLES OF FUSED SILICA

Application filed January 5, 1928, Serial No. 244,711, and in France January 6, 1927.

The process consisting of reproducing the shapes of given dies or matrices, upon blanks previously raised to the softening point, has long been known and practised under the name of stamping or die-pressing. The stamping of silica is likewise known, since for a very long time the factories making articles of fused silica have utilized in certain operations the shaping of silica ingots, at the moment when they emerge from the furnaces and without awaiting their cooling, by the aid of mechanical or hydraulic presses and dies of various kinds. However, it is well known that this process presents the following disadvantages:—

(1) The shapes of the articles are not at all accurate and their surface is rough by reason of the sand which remains adhering to the ingot;

(2) The vitrification is not equal throughout the mass;

(3) The articles possess, at or about the middle of their thickness, a welding plane formed by the flattening of the ingot, which as is known has the general appearance of a tube. This disadvantage is particularly serious, since the presence of free silicon or other impurities upon the internal surface of the ingot is practically inevitable. These impurities become occluded in the thickness of the stamped articles and are the cause of breakage when heated, reduced resistance to chemical agents or over-heating in an electrical field. In one word, they affect seriously all the qualities of fused silica.

In order to avoid these disadvantages, it has been sought to suppress the welding plane and to reheat the silica parts of any kind, drawn out into rings, cut up from moulded pieces or broken up from ingots, in order to submit them thereafter to the action of the stamping tool. It has likewise been proposed to manufacture articles of fused silica by die-pressing according to the customary methods of the stamping of metals, but without defining the points necessary to render this process applicable to silica.

As a matter of fact, of all the processes tested, none has led to obtaining articles responding to the required conditions, the reasons being as follows:—

(1) Silica being still plastic at about 1400° C. and beginning to volatilize at about 1600° C., the tests of stamping were carried out upon articles heated to about 1600° C., that is to say until they presented a sufficient plasticity to be deformed by pressure after being carried beneath the tool. The result is to yield articles of which the details do not come out perfectly, because they do not retain sufficient plasticity, however rapidly the operation is performed.

(2) In the face of the difficulty or bringing out the details sufficiently clearly, operators have been led to utilize a higher pressure and to maintain it for a certain time upon the article. The immediate result is to cause the appearance of cracks and fissures upon the surfaces.

(3) In the majority of cases, it has not been possible to attain the temperature of 1600° C. throughout the mass of silica to be heated, without the latter collapsing under its own weight and coming in contact with the bed of the re-heating furnace or the walls of the crucible. It then becomes impossible to withdraw it from the furnace by reason of the reaction which takes place between it and the carbon of the crucible, causing the plastic mass to adhere to the latter. Admitting even that an external force may allow of freeing the blank when brought to the plastic state, this latter carries with it particles of carbon or of carborundum which reappear upon the surface of the article after it has been die-pressed. In particular, the die-pressing of articles from shapeless blanks, re-heated upon the bed of a furnace or in a crucible, is completely impossible because the blank cannot be withdrawn from the furnace after the moment when carborundum is formed, which is well below the temperature of 1600° C. provided for the die-pressing.

The present invention has for its object a process allowing of carrying out the die-pressing or stamping of blocks of fused silica of any shape in a suitable manner.

For the economy of the process, it is indispensable to be able to utilize shapeless blocks of opaque or transparent silica, natural or already fused, and therefore to be able to re-heat them in a furnace.

The process according to the invention consists in utilizing a crucible or a heating bed, in exceeding considerably the softening temperature of silica and in raising the block to about 2200° C., or in a more general manner to a temperature such that there is produced an abundant volatilization of the silica. Since the hottest part of the furnace must necessarily be the bed, or the wall of the crucible, upon which the block of silica rests, the volatilization is produced mainly at the expense of the portion of the block which is in contact, thus avoiding any adherence of the latter to the crucible and any adherence of carborundum.

Moreover it has been ascertained that when several blocks are heated successively upon the same point of the bed, the stamped articles which they yield appear less and less homogeneous in that portion of them which corresponds to the part of the block which was in contact with the crucible.

This defect (which may be due to the formation of silicides) is obviated completely if care be taken to heat each block at a point of the bed different from the preceding one, for example by turning the furnace during the heating or between the operations. This rotation has the further advantage of shaping the block of silica like a slightly flattened ball, which it is easier to seize and to place rapidly between the dies, or to slide thereinto by means of a gutter by tilting the furnace.

The silica thus prepared may be die-pressed almost without the application of force, so high is its plasticity, and the smallest details of the dies are reproduced with fidelity even upon very thin articles.

Nevertheless, if no other precautions than those mentioned above be taken, a certain number of the articles still present superficial cracks of very small depth but of fairly large number, the appearance of which takes place most frequently in the course of cooling or sometimes afterwards, thus disclosing the existence of internal stresses near the surfaces. These cracks are avoided by the following arrangements, which may be employed separately or concurrently, according to the circumstances and to the shapes of the articles:

(1) Very rapid action of die-stamping and immediate withdrawal from the dies, by means of presses operated in a positive manner on forward and return strokes, avoiding percussion effects if possible.

(2) Use of matrices raised to a very high temperature (1000 to 1100° C.) in order to reduce the cooling of the skin of the articles in contact with the matrices.

(3) Reheating of the articles in a closed vessel or chamber at 1200° C. at least, after their withdrawal from the mould, in order that the reheating of the skin shall take place both externally, by means of the heat radiated by the furnace, and internally, at the expense of the heat stored up in the article.

The apparatus allowing the application of the process is eser ially constituted by a reheating furnace and matrices combined as a single tool by the press.

The furnace may attain a temperature of 2200° C., and revolve about an axis even during its operation.

Its hearth or laboratory is constituted with advantage by zirconium. It may also be formed of graphite or any agglomerate of carbon. One practical realization of this furnace consists of a crucible made of graphite, highly insulated against heat losses, and adapted to turn about its axis in the centre of a solenoid traversed by high frequency currents; the latter induce in the crucible circulating or eddy currents which raise its temperature to the desired degree, without preventing it from revolving upon its axis if necessary. A hole in the stopper plug allows of following the progress of the operation.

The matrices may be constituted by any suitable material of low conductivity, such as graphite or an agglomerate of carbon. It is however desirable to form them of a polished metal, in order to obtain a smooth finish on the articles, and to select in this case a metal resistant to oxidation, but having a high melting point. Nickel and certain alloys of ferro-chromium are particularly suitable for this use. They may, in fact, be raised without disadvantage to the temperature of 1000 to 1100° C., either by contact with the articles, or by means of a complementary supply of external heat, if the heat lost by the articles in the course of the succession of the operations is not sufficient. For this complementary heating of the matrices it is sometimes convenient to utilize resistance heating by bringing the two matrices together into contact and utilizing a very low voltage current of desired intensity, in the manner practised for electric contact welding, or again high frequency induction heating, or more simply heating by a gas burner with or without pressure supply.

The press may be operated mechanically, hydraulically or by any other system. For reasons of space or to obtain flexibility, it is generally advisable to employ a hydraulic press actuated by a pump with variaable delivery. This press may be vertical or horizontal and may comprise one or more pump bodies, single or double-acting.

Lastly the closed space or chamber for reheating to 1200° C., may be easily afforded by a small gas furnace, which can with advantage be arranged in the manner of a glass works arch, so that the articles end by cooling therein, thus completing the cycle of operations for the machine.

Figure 2:
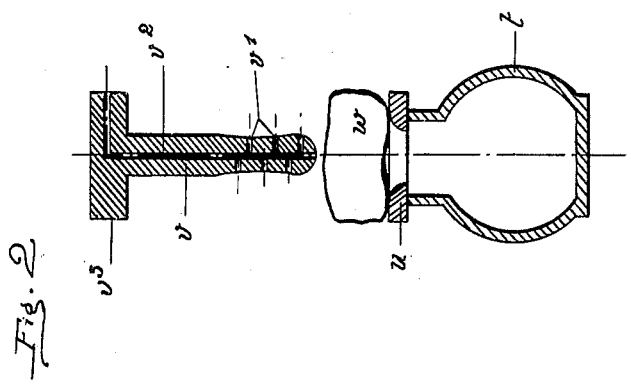

Upon the accompanying drawing, Figure 1 represents in elevation, partly in section, a form of construction of an apparatus for stamping silica by the process according to the present invention. Fig. 2 is a view partly in section of the blank and the parts which act upon it before the drawing operation is started, and Fig. 3 is a similar view just after the drawing operation has been completed.

$a$ designates the crucible heated by induction of high frequency currents generated by the fixed winding $b$; it is carried by a casing $c$ and insulated from the latter by lagging $d$. The whole can be revolved upon the axis $e$ by means of a crank $f$. $g$ is a plug stopper pierced with a hole $h$ through which the temperature can be watched and the volatilization controlled. $i\ i$ are two cylinders of a vertical double-acting hydraulic press, operated by the variable delivery pump $k$ operated itself by the electromotor $l$.

$m\ m$ are nickel matrices which, according to the article to be stamped out, may be single or composite, fixed at the ends of the piston rods $o\ o$; they move towards or away from one another under the action of the latter, by reason of the operation of the distributor $n$ which regulates the working of the press; during this time the table $p$ remains fixed with the frame and serves as a point of support to allow the opening of the mould upon the two faces; $q$ is a gas-ring fixed to the table, which allows the heating of the matrices if necessary; $r$ is the furnace for heating up to 1200° C., and heated by gas-burners $s$, into which furnace the articles are introduced immediately after removal from the mould, in order to heat their surfaces and then to allow them to cool down slowly.

It is possible to combine the stamping process previously described with other operations already known for obtaining articles made of silica glass. Thus a stamping operation may be combined with a subsequent operation of blowing in a mould in the following manner:—

The blank is worked in two stages:—

(1) In the case of a stamping operation, conducted in accordance with the process, the blank is brought to the shape of a closed tube of suitable thickness by means of a punch or mandrel and a draw-plate;

(2) The tubular blank thus obtained is blown and moulded, by pressure of compressed air for example.

The two operations take place consecutively without stoppage, in order to require only a single reheating of the initial shapeless blank.

For this purpose, the apparatus comprises (as represented diagrammatically in axial section in Figure 1 of the accompanying drawing):—

(1) A lower matrix formed by the combination of a mould $t$ surmounted by a draw-plate $u$, the whole being fixed upon the table of a hydraulic press, for example.

(2) An upper matrix composed of a draw-punch or mandrel $v$ pierced with holes $v^1$ and with an axial passage $v^2$ connected to a compressed air pipe line. This punch has in addition a shoulder $v^3$, which acts to press the excess of plastic silica against the upper face of the draw-plate during the blowing, thus ensuring sufficient tightness.

The appearance of the blank $w$, at the moment when the drawing operation ends and the blowing operation begins, is that indicated in Figure 3.

The mould may be single, as in the case illustrated, or may comprise a certain number of associated parts of small dimensions which may be separated from one another after an article has been formed in the mould.

The articles obtained by this process are perfectly vitrified throughout their mass, their surfaces are smooth and their thicknesses may be small or great as desired, uniform or variable for the same article, according to the configuration of the mandrel, the draw-plate and the mould.

What we claim is:

1. A process for the hot stamping of silica articles, comprising heating a block of silica in contact with a heating wall up to a temperature above 2200° C., and die-pressing the block, for the purpose described.

2. A process for the hot stamping of silica articles, comprising heating a block of silica in contact with a heating wall up to a temperature above 2200° C., adapted to produce an abundant volatilization and the spheroidal state of the silica, and die-pressing the block, for the purpose described.

3. A process for the hot stamping of silica articles, comprising heating a block of silica in contact of a heating wall up to a temperature above 2200° C., adapted to produce an abundant volatilization of the silica, and die-pressing the block, and changing the parts of the heating wall in contact with the block of silica before each heating operation, for the purpose described.

4. A process for the hot stamping of silica articles, comprising heating a block of silica up to a temperature of about 2200° C., adapted to produce an abundant volatilization of the silica, and die-pressing the block, immediately removing the article from the dies and immediately heating it in a closed space raised to a temperature of above 1200° C., for the purpose described.

5. A process for the hot stamping of silica articles, comprising heating a block of silica up to a temperature above 2200° C., adapted to produce an abundant volatilization of the silica, and die-pressing the block, and immediately bringing the article into the shape of a closed tube and blowing the same in a mould, for the purpose described.

In testimony whereof we have signed our names to this specification.

PIERRE LA BURTHE.
GASTON DELPECH.